United States Patent
Kobryner

[15] 3,668,591
[45] June 6, 1972

[54] BUS BAR FOR ELECTRIC CONNECTIONS

[72] Inventor: Herman H. Kobryner, Forest Hills, N.Y.

[73] Assignee: Murray Manufacturing Corporation, Jericho, N.Y.

[22] Filed: Nov. 23, 1970

[21] Appl. No.: 92,220

Related U.S. Application Data

[63] Continuation of Ser. No. 878,154, Nov. 19, 1969, abandoned.

[52] U.S. Cl. ..................................339/198 N, 339/272.1
[51] Int. Cl. ..........................................H01r 9/00, H01r 7/12
[58] Field of Search..................339/198, 125, 126, 127, 128, 339/134, 135, 272.1, 42; 248/224

[56] References Cited

UNITED STATES PATENTS

| 2,708,088 | 5/1955 | Steinke | 248/224 |
| 2,967,287 | 1/1961 | Sori | 339/198 N |

Primary Examiner—David H. Brown
Assistant Examiner—Robert A. Hafer
Attorney—Sandoe, Hopgood & Calimafde

[57] ABSTRACT

The invention contemplates a construction for parts of a neutral bus-bar assembly whereby the assembly can be unit-handling without requiring tools or special fasteners, such as bolts, to complete the assembly. At the same time, the unit-handling assembly achieves the added function of providing an insulating shield for the bus-bar and all electrical connections thereto.

13 Claims, 5 Drawing Figures

INVENTOR.
HERMAN H. KOBRYNER

BY Sandoe, Hopgood & Calimafde
ATTORNEYS

BUS BAR FOR ELECTRIC CONNECTIONS

This application is a continuation of Ser. No. 878,154, filed Nov. 19, 1969, now abandoned.

This invention relates to the construction of a bus-bar assembly, particularly suited to unit-handling apart from its ultimate electrical junction box, switch box, meter box, or other enclosure.

Bus-bars of the character indicated normally comprise the elongated conductive element which is the bar itself, and this element must be mounted in spaced relation to the floor or back wall of the enclosing box. Since provision must be made for the fact that some electric neutrals are "floating" or ungrounded to the box the bar is conventionally set on spaced insulating feet, secured to the floor or back wall of the box. The bar itself is in turn conventionally secured, as by screws, to each of these insulating supports. Such constructions mean either that the supports must first be assembled to the box, before the bar is assembled to the supports, or the ends of the bar must be preassembled by bolting to the supports, before this preassembly is in turn bolted to the box.

It is an object of the invention to provide an improved bus-bar construction whereby simplified assembly and unit-handling are achieved.

A specific object is to achieve the foregoing object with a structure of bar and insulating supports that are self-retaining without requiring tools or bolts or other securing devices.

Another specific object is to achieve the stated objects with a structure which further provides an elongated shielding or insulating function to permit mounting of the neutral bus-bar assembly relatively close to one of the side walls of the enclosing box.

A still further object is to meet the stated objects with a construction that is flexibly adaptable to different installation requirements, including bus-bars of different length, grounded neutrals or floating neutrals, and the like.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figure 1:
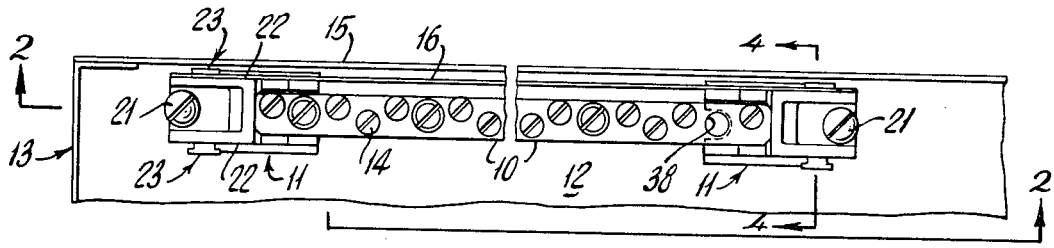
FIG. 1 is a fragmentary plan view of a neutral bus-bar assembly of the invention, installed in a box or other electrical enclosure structure.
Figure 2:
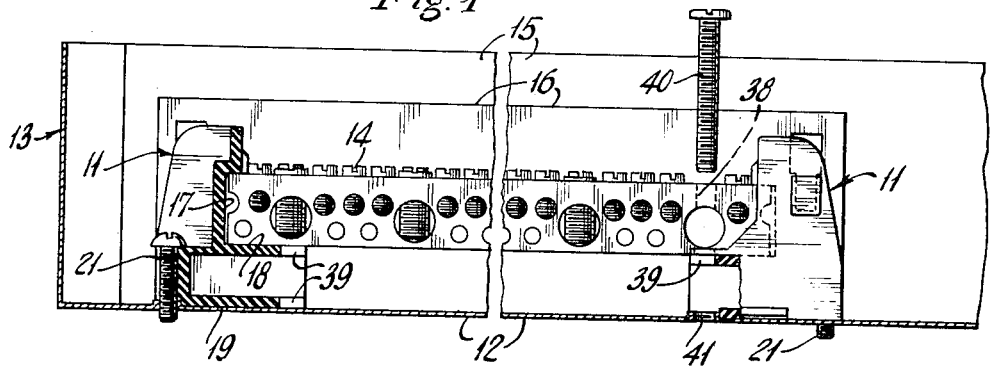
FIG. 2 is a vertical sectional view, taken in the alignment 2—2 of FIG. 1.

Briefly stated, the invention contemplates a construction for parts of a neutral bus-bar assembly whereby the assembly can be unit-handling without requiring tools or special fasteners, such as bolts, to complete the assembly. At the same time, the unit-handling assembly achieves the added function of providing an insulating shield for the bus-bar and all electrical connections thereto.

Referring to FIGS. 1 to 4 of the drawings, the invention is shown in application to an elongated conductive neutral bus-bar 10 of rectangular cross-section, mounted upon spaced insulating supports 11 which may be identical. The parts in turn are mounted on the floor or rear wall 12 of an enclosing box 13, for electrical junction, switching, metering or the like functions. The bar 10 may be drilled and tapped as necessary or desired, to provide selective availability of variously patterned neutral or ground-lead connections, depending upon the number and nature of different electrical lines and functions to be served within enclosure 13. In the form shown, the elongated dimension of the cross-section of the bar extends vertically from the box floor 12, and clamp screws 14 and like electrical connector devices are accessible along the top edge of bar 10, to serve neutral wire leads (not shown) entering corresponding openings via one of the upstanding side walls of the bar 10. The bar 10 and its supports are mounted closely adjacent one of the side walls 15 of the box 13, and a thin flat shield 16 of insulating sheet material separates bar 10 (and any line connections thereto) from the adjacent wall 15.

In accordance with the invention, the bar 10, its supports 11 and the shield are assembled and inherently retained as a unit-handling subassembly, without use of tools or special fasteners. To this end, each support 11, which may be of one-piece injection-molded plastic construction, comprises a body having a bar-receiving and locating socket 17, facing in a direction parallel to the base-mounting plane 12. The socket 17 is characterized by a supporting side wall or shoulder 18 which provides an extended bearing surface for support of an end of bar 10, particularly when force is applied to secure one or more of the clamp screws or terminals 14. The support wall 18 is spaced from a base or seating surface 19, to determine the ultimately mounted spacing of bar 10 from the floor 12 of box 13. A part of the heel of the support body is open at 20, to permit location by a bolt 21, and to permit secure mounting to the floor 12.

Each support 11 integrally includes, at corresponding parts of its parallel upstanding side faces 22, one or more short laterally projecting lugs 23–24. The upper lugs 23 are shown with undercut edges, along the bottom edge 25 and along each of the opposed upstanding side edges 26–27, thus providing an upstanding dove-tail section at the lugs 23. The lower lugs 24 are generally prismatic, without undercut edges, and are shown at the lower-most part of the body.

The shield panel 16 extends longitudinally to overlap both supports, and its width or vertical extent spans at least substantially the full vertical extent of the supports 11. At each longitudinal end, the shield panel 16 includes cut-outs 28–29 appropriate for snap-locking retention of assembly to a support 11. The upper cut-out 28 is shown as generally T-shaped, with an enlarged upper area to clear the maximum projected area of lug 23, and with a narrowed downwardly extending contiguous area between edges 30 to engage under the side-edge dovetail formations 26–27 of lug 23. When thus assembled, i.e., when shield 30 is moved with respect to support 11 to place the cut-out bottom edge 31 within the undercut of the lower edge 25, the other cut-out 29 is in registry with the lower lug 24; in other words, the vertical space $H_1$ between cut-outs 28–29 approximates but is just less than the corresponding distance $H_2$ between opposed shield-abutting surfaces of the two lugs 23–24. Preferably, the width of the undercut-edge recesses at 26–27 so approximates the thickness of shield 16, that shield 16 is necessarily resiliently stressed in the course of engagement at edges 30. Thus, when lug 23 is fully positioned in the lower area of the cut-out 28, the cut-out 29 clears lug 24 to permit locked snap-retention of the assembled parts. And, when such snap-action assembly is performed for the other support 11, at the opposite end of shield 16 (and with the neutral bar inserted in both supports 11), the subassembly is complete and unit-handling.

Figures 3, 4, 5:
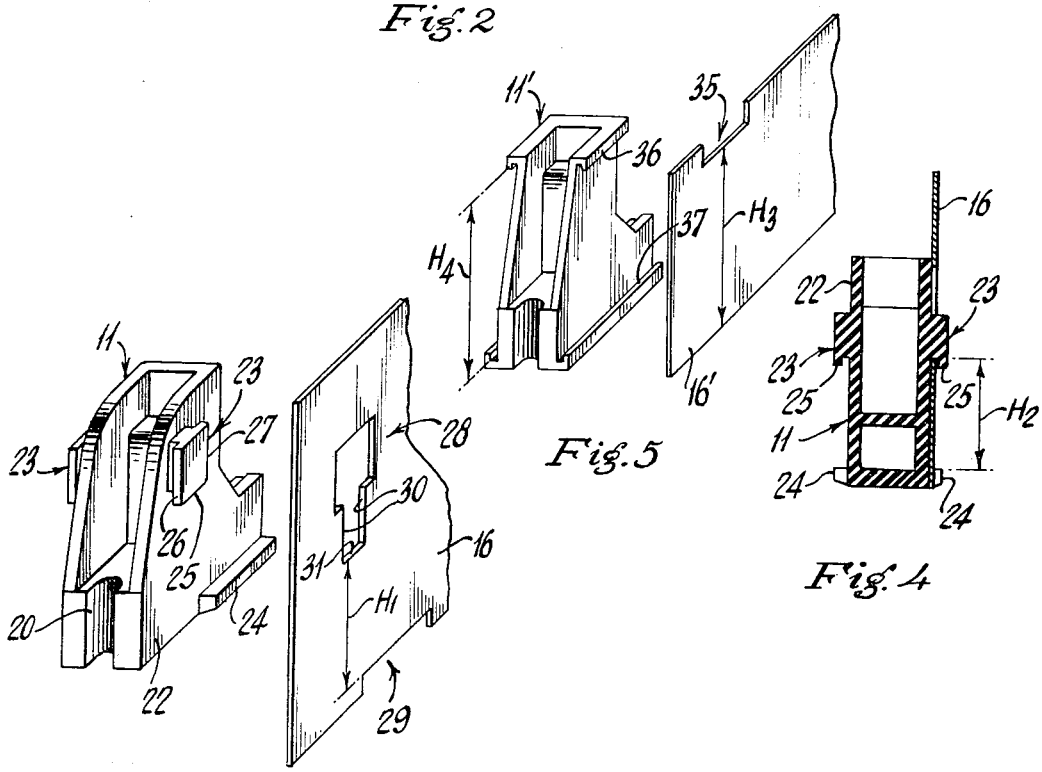
FIG. 3 is an exploded fragmentary view of parts of FIG. 1, prior to assembly.
FIG. 4 is a sectional view in the plane 4—4 of FIG. 1.
FIG. 5 is a view similar to FIG. 3 to illustrate a modification.

FIG. 5 shows a modification in which a shield 16' is provided with but one cut-out 35, for snap-action retention of the shield to the support 11', between opposed undercut edges of spaced upper and lower lugs 36–37. In this situation, the vertical distance $H_3$ between shield edges which directly abut undercut surfaces at lugs 36–37 approximates but is just short of the vertical distance $H_4$ between the shield-abutting surfaces of lugs 36–37. Assembly is made by entering the lower shield edge in the undercut of lower lug 37 and by resiliently bowing the shield 16' to permit resiliently snapped entry of the cut-out 35 over lug 36 and into the undercut recess thereof.

It will be seen that the invention provides simple structure to achieve the stated objects. No screws or other fasteners are required to complete the subassembly. The supports 11 (11') are universally applicable to a variety of bus-bar lengths and formations, and the only special provision necessary to accommodate different bus-bar lengths is the use of corresponding different shield lengths, between end cut-out locations. For example, a single standard shield, of given length, may be formed with longitudinally spaced sets of knock-outs, of the FIG. 3 or the FIG. 5 variety, at each longitudinal end, so that one such shield may assemble with equal facility for each of several bus-bar lengths, using the differently spaced snap-locking end knock-outs as appropriate to the selected bus-bar length. Moreover, a through-passage 38 near one end of bar 10, and aligned with a suitable opening 39 near the foot of the support 11, permits optional direct bonding of the neutral bar 10 to the enclosure floor 12, as by bolt means 40 engaged to a registering tapped hole 41 in floor 12.

While the invention has been described in detail for the preferred forms shown, it will be understood that modifications may be made without departure from the scope of the invention.

I claim:

1. Terminal-assembly structure adaptable for unit-handling subassembly prior to installation in an electric-wiring box enclosure, comprising an elongated conductive bus-bar, two like supports of insulating material, each of said supports comprising an integral one-piece body with a base to seat upon an enclosure-box wall and having a bar-receiving socket with a longitudinally facing side opening directed parallel to and offset from the seating surface of said base, means including like undercut integral lugs projecting in both directions from opposite sides of said body, and an insulating shield of flat stiffly flexible sheet material having cut-out portions at its respective end regions, each of said cut-out portions having a snap-engagement relation with one of said lugs when adjacent thereto, said cut-out portions being longitudinally spaced from each other to an extent matching the longitudinal spacing of a lug on one side of one support from the corresponding lug of another support when said supports are assembled to said bar, whereby depending upon end-use requirements two standardized supports may universally serve assembly to bars of various length, by selection of a shield of length appropriate to the selected bar length, and retaining the subassembly by snap-engagement of the cut-out portions to corresponding undercut integral lugs on one side of said supports.

2. The structure of claim 1, in which said shield is generally rectangular, with a width such as to extend substantially from the base-seating plane of said supports to at least substantially the maximum elevation of said supports when engaged to said support lugs.

3. The structure of claim 1, in which said shield is generally rectangular, with a width such as to extend substantially from the substantially above the upper limit of said bar when engaged to said support lugs.

4. The structure of claim 1, in which the lateral sides of said supports are substantially flat and parallel except for the projection of said lugs, whereby said flat sides provide extensive stabilizing area for the erect positioning of said shield when engaged to said support lugs.

5. The structure of claim 1, in which said bar has a vertical through-passage that is upwardly exposed at overlap with a part of the base of one of said supports when assembled thereto, the base of said supports being open in alignment with said passage when the passage end of a bar is assembled thereto, whereby a metal clamp bolt may be passed through said passage and the aligned opening in the adjacent support, for directly and electrically clamping said bar to the seat-supporting wall of the enclosure box, thereby establishing said bar as a box-grounded neutral.

6. The structure of claim 1, in which each of said supports has a mounting opening longitudinally offset from the maximum inserted extent of said bar into said socket, whereby a securing bolt may anchor the support to the seat-supporting wall of the enclosure box without electrically connecting said bar to the enclosure box.

7. The structure of claim 1, in which at least one lug on each of the opposite sides of said body is generally dovetailed, with undercut edges perpendicular to the seating surface of said base.

8. The structure of claim 1, in which at least one lug on each of the opposite sides of said body has an undercut edge spaced above and substantially parallel to and facing the seating surface of said base.

9. The structure of claim 1, in which one lug is positioned above another lug on each of the opposite sides of said body and in which each of said one lug and of said other lug is formed with an undercut edge, said undercut edges facing in opposite directions.

10. Terminal-assembly structure adaptable for unit-handling subassembly prior to installation in an electric-wiring box enclosure, comprising an elongated conductive bus bar, two supports of insulating material for supporting the spaced ends of said bar, each of said supports comprising an integral one-piece body with a base to seat upon an enclosure-box wall and having a bar-receiving socket with a longitudinally facing side opening directed parallel to and offset from the seating surface of said base, means including like undercut integral lugs projecting laterally from corresponding sides of said support bodies when assembled to said bar, and an insulating shield of flat stiffly flexible sheet material having cut-out portions at its respective end regions, each of said cut-out portions having a snap-engagement relation with one of said lugs when adjacent thereto, said cut-out portions being longitudinally spaced from each other to an extent matching the longitudinal spacing of a lug on one side of one support from the corresponding lug of another support when said supports are assembled to said bar; whereby, depending upon end-use requirements, said supports may universally serve assembly to bars of various length, by selection of a shield of length appropriate to the selected bar length, and retaining the subassembly by snap-engagement of the cut-out portions to corresponding undercut integral lugs on one side of said supports.

11. Terminal-assembly structure adaptable for unit-handling subassembly prior to installation in an electric-wiring box enclosure, comprising an elongated conductive bus bar, two supports of insulating material, each of said supports comprising an integral body with a base to seat upon an enclosure-box wall and having a bar-receiving socket with an opening directed parallel to and offset from the seating surface of said base, means including like integral lugs projecting in both directions from opposite sides of said body, and an insulating shield of stiff material having cut-out portions at its respective end regions, each of said cut-out portions being engageable with one of said lugs when adjacent thereto, said cut-out portions being longitudinally spaced from each other to an extent matching the longitudinal spacing of a lug on one side of one support from the corresponding lug of another support when said supports are assembled to said bar; whereby depending upon end-use requirements two standardized supports may universally serve assembly to bars of various length, by selection of a shield of length appropriate to the selected bar length, the subassembly being retained by engagement of the cut-out portions to corresponding integral lugs on one side of said supports.

12. Terminal structure according to claim 11, in which each of said supports has a mounting opening offset from the maximum projection of an inserted bar in said socket, whereby a securing bolt may anchor the support to the seat-supporting wall of the enclosure box without electrically connecting the bar to the enclosure box.

13. Terminal-assembly structure adaptable for installation in an electric-wiring box enclosure, comprising an elongated conductive bus bar, two supports of insulating material for supporting the spaced ends of said bar, each of said supports comprising an integral body with a base to seat upon an enclosure-box wall and having a bar-receiving socket with an opening directed parallel to and offset from the seating surface of said base, and insulating shield of stiff material to connect corresponding sides of said support bodies when assembled to said bar, interengageable formations on said support bodies and on the end regions of said shield for retaining the connection of said shield to said support bodies, said formations on said shield being longitudinally spaced from each other to an extent matching the longitudinal spacing of the said formations on one side of one support from the corresponding formations of another support when said supports are assembled to said bar; whereby, depending upon end-use requirements, said supports may universally serve assembly to bars of various length, by selection of a shield of length appropriate to the selected bar length, the subassembly being retained by engagement of corresponding interengageable formations.

* * * * *